July 10, 1934.                O. T. McILVAINE                1,965,849
                              ELECTRONIC TUBE
                          Filed July 29, 1927        3 Sheets-Sheet 1

Oran T. Mc. Ilvaine
            Inventor
By Smith and Freeman
            Attorneys July 10, 1934.   O. T. McILVAINE   1,965,849
ELECTRONIC TUBE
Filed July 29, 1927   3 Sheets-Sheet 2
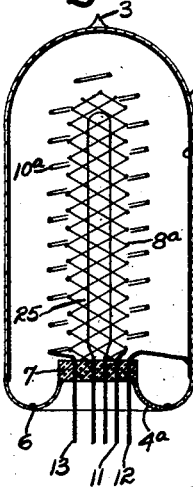
Fig. 7
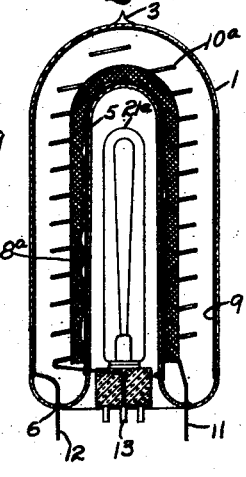
Fig. 8
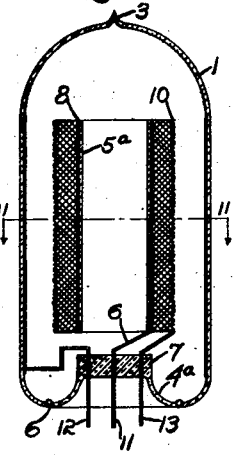
Fig. 9
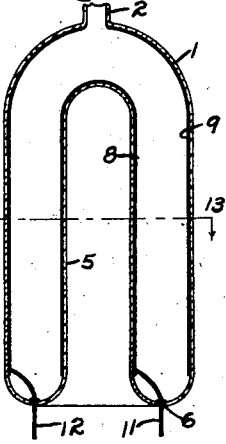
Fig. 10
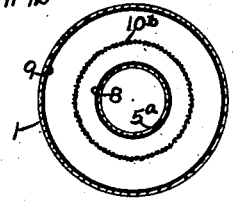
Fig. 11
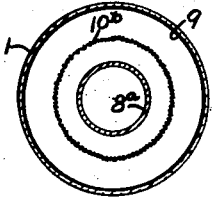
Fig. 12
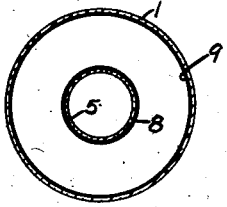
Fig. 13
Fig. 14
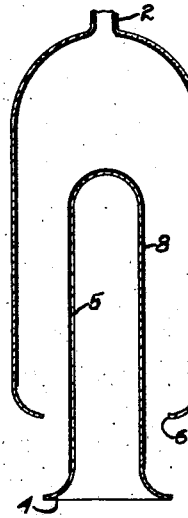
Fig. 15
Fig. 15ª
Oran T. Mc Ilvaine
Inventor
By Smith and Freeman
Attorneys July 10, 1934.     O. T. McILVAINE     1,965,849
ELECTRONIC TUBE
Filed July 29, 1927     3 Sheets-Sheet 3

Oran T. McIlvaine
Inventor
By Smith and Freeman
Attorneys

Patented July 10, 1934

1,965,849

UNITED STATES PATENT OFFICE 1,965,849

ELECTRONIC TUBE

Oran T. McIlvaine, East Cleveland, Ohio, assignor to McIlvaine Patent Corporation, St. Charles, Ill., a corporation of Delaware Application July 29, 1927, Serial No. 209,281

13 Claims. (Cl. 250—27.5)

This invention relates to electronic tubes and has for its object the provision of a tube of the simplest and cheapest construction which shall operate successfully for an indefinitely long period of time and with peculiarly simple appurtenances; the provision of a tube containing a minimum quantity of metal and hence as free as possible from any tendency to occlude or evolve gases; the provision of a simple and inexpensive type of tube which can be used either with direct current or alternating current, or other sources of heat; the provision of a new construction of globe or container for tube-use; the provision of a tube which will operate at particularly low temperature; the provision of a new type of tube which will itself constitute a source of potential; while further objects and advantages of the invention will become apparent as the description proceeds.

Figure 1:
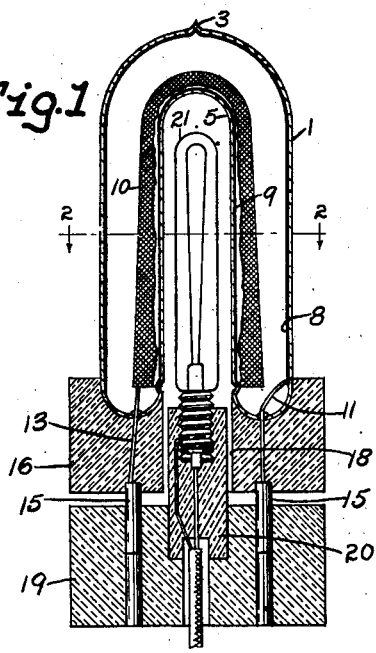
Figure 3:
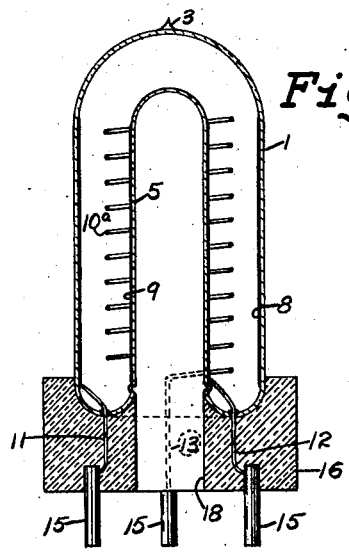
Figure 2:
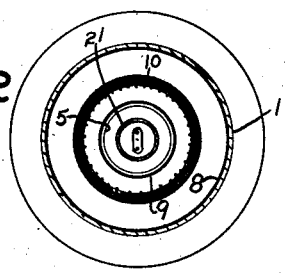
Figure 4:
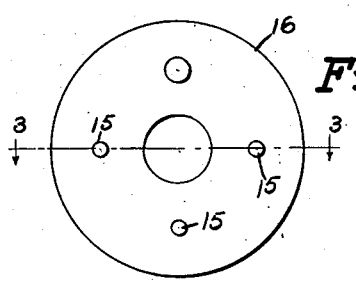
Figure 5:
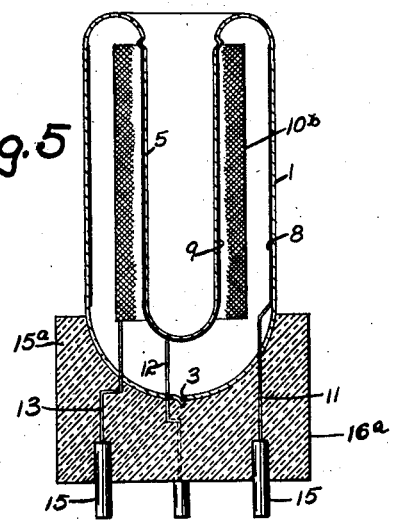
Figure 6:
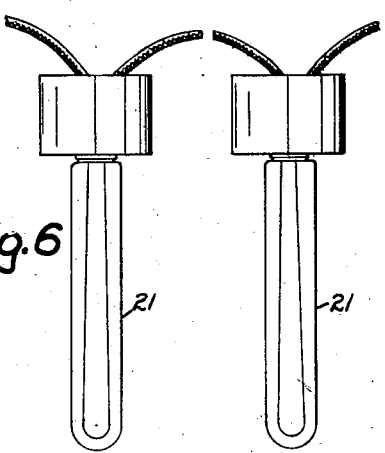
Figure 16:
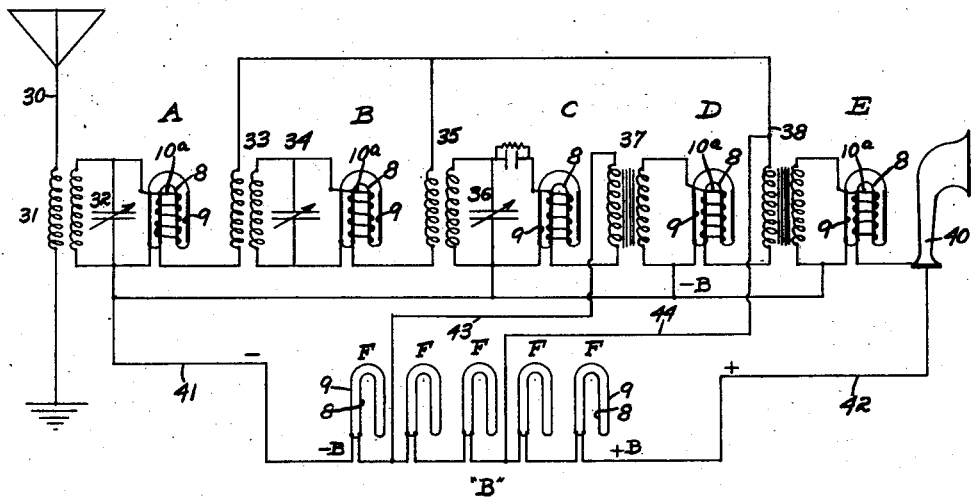
Figure 17:
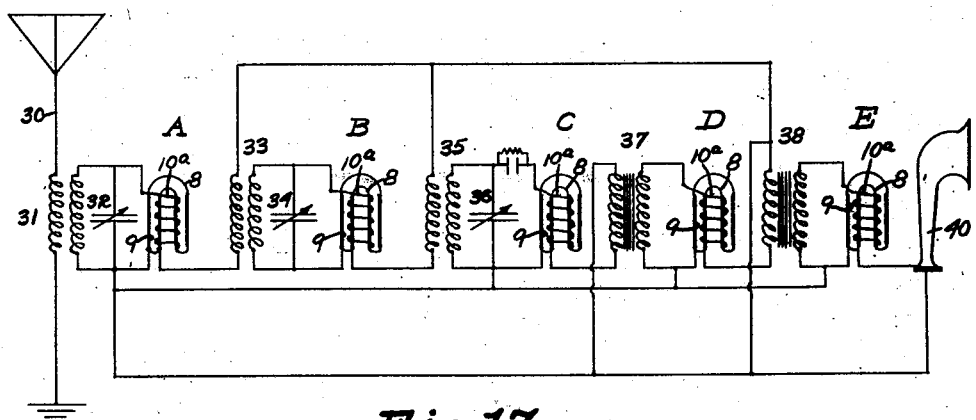

In the drawings, I have shown certain illustrative embodiments of my invention. Fig. 1 is a vertical sectional view of a tube embodying the preferred features of my invention combined with a preferred form of heating device; Fig. 2 is a horizontal view on the line 2—2 of Fig. 1; Fig. 3 is a sectional view of a modified form of tube; Fig. 4 is a bottom plan view of one of the bases shown in Fig. 1 or 2; Fig. 5 illustrates another modification in the tube and a different mode of basing the same; Fig. 6 illustrates two of the heating elements removed; Figs. 7 and 8 illustrate two modifications of my invention wherein the photoelectric effect is employed; Fig. 9 illustrates another modification; Fig. 10 illustrates the very simplest form of my invention, namely a heat potential tube; Fig. 11 is a horizontal sectional view on the line 11—11 of Fig. 9; Fig. 12 is a view similar to Fig. 11 but showing a further modification; Fig. 13 is a sectional view on the line 13—13 of Fig. 10; Fig. 14 illustrates one mode of use of a characteristic construction of tube; Fig. 15 illustrates the mode of manufacture; Fig. 15a shows a modified form of flare; Fig. 16 is a wiring diagram showing the use of my improved tubes as detectors, amplifiers (both in radio frequency and audio frequency) and as potential sources; and Fig. 17 is a wiring diagram showing a radio reception apparatus using my improved tubes but without batteries.

In my improved tubes the cathode consists of a layer of some solid substance which readily emits electrons under the influence of radiant energy, this material being plated directly on the glass wall of the tube or on a conducting layer which is suitably plated on the tube wall; the anode is also, preferably, formed of a thin layer of conductive material plated on glass; and the tube is preferably made of a new and peculiar shape which facilitates making, mounting, heating, and operation; while facilities are preferably provided enabling either the use of such tubes in ordinary standard radio sets with standard equipment, or in telephoning and signalling, or in numerous new and fundamental ways.

The globe is preferably made of glass with a cylindrical side wall 1 reduced at one end to the stem 2 which is ultimately sealed off leaving a point 3. Hermetically fused to the opposite end of the side wall is the flange 4 of the flare which has a cylindrical walled hollow body 5 projecting into the globe and spaced from and concentric with the outer wall and extending nearly to the closed end thereof. The flange is sealed to the outer wall at 6 in the usual manner customary in making incandescent lamps and the two parts thus assembled define a chamber which is everywhere annular except near the point 3.

In the preferred form of my invention the inner surface of the wall 1 and the outer surface of the body 5 are rendered conducting by the deposit of a suitable substance thereon, which substance may be either the same or different from the electron-emitting substance, and may be the same or different on the two walls. It is necessary that it consist of some substance which does not occlude gases to a serious extent and that the layers on the two walls be insulated from each other, that it be electrically conducting, and that the material on or forming the cathode have a greater electron-emitting capacity than the anode under the particular conditions to which the two electrodes are respectively subjected in actual use. Either wall can be made the cathode and the other the anode, sometimes the one and sometimes the other being employed in accordance with the intended mode of use. The closed ends of the outer and inner bodies can be covered completely with the conducting layer as shown in Fig. 1 or only the cylindrical portions as shown in the other views. The coating can be applied before assembling as shown in Fig. 15 or after assembling, depending upon convenience and upon the nature of the materials. If coated prior to assembling the conducting layer can obviously consist only of those substances which withstand the necessary temperatures and are unaffected by atmospheric oxygen, e. g. silver, gold, platinum, nickel, chromium; if assembled before coating the latter may consist of such substances as potassium, sodium, caesium, magnesium, barium, calcium, strontium. In the former case the metal is usually deposited by a wet method; in the latter case the coating is best effected by vaporizing pellets of the metal inside the chamber after exhaustion of air. Continuity of metal between the inner and outer walls is easily avoided either by shielding the surface adjacent the junction of the two bodies so as to prevent deposition of metal at that point or by heating that region locally after the deposition has been effected so as to distill the metal away.

In case the anode and cathode are to be subjected to sufficiently dissimilar physical conditions to cause the necessary inequality of electron emission one can employ the same metal on both electrodes but ordinarily it is best to employ a readily emitting substance on the cathode and a more inert substance for the anode.

In case the metal desired for the cathode coating be one which melts below the working temperature desired to be maintained, or in case one apprehends danger of accidentally surpassing the melting point at any time during use, it is obvious that a mere coating of such metal on the glass or other surface will not be permanent. To meet this situation I first coat the glass or other surface with an adherent metal of sufficiently high melting point such as tungsten, molybdenum, nickel, copper and oxidize the surface slightly and then impregnate with the vapor of the emitting metal. In place of oxidizing the underlying metal it is sometimes permissible when more convenient to coat it with phosphorous, this being done before evacuating, and after evacuating to distill the cathode metal into the tube so as to condense on and in and about the phosphorous.

I have denoted the anode coating by 8 and the cathode coating by 9 in each view. In Figs. 1, 2, 3, and 5 the anode is located on the wall of the body 1 and the cathode on the wall of the body 5; in Figs. 7, 8, 9, 11, 12, 14, and 16 the cathode is on the wall of the body 1 and the anode inside. The emitting material may consist of any suitable substance for that purpose, e. g. silver, thorium, potassium, sodium, caesium, or any of the alkali-earth metals. In Figs. 9 and 11 the anode consists of a layer of metal plated on a cylinder 5$^a$ of glass or ceramic material supported inside the globe by a metal bracket 6 and wholly separate from the flange 4$^a$ which here terminates in a press 7 as customary in many incandescent lamps or vacuum tubes. In Fig. 12 the internal glass body is wholly omitted and the anode 8$^a$ consists of a metal sheet only. In these cases the cathode 9 is plated on the interior of the body 1.

In case the tube is to be employed for sending, receiving, transmitting, detecting, or amplifying currents, signals, speech, etc. a grid of suitable form is interposed between the anode and cathode. In Fig. 1 this consists of the screencloth cap 10; in Figs. 3, 7, 8, 14, 16 and 17 it is represented as a mere wire helix 10$^a$; and in Figs. 5, 9, 11 and 12 as a foraminous cylinder 10$^b$. The anode, cathode, and grid (if used) are connected to wires 11, 12, 13 which traverse the seal 6 and are connected to suitable terminals. In the present preferred form of the invention these terminals consist of pins 15 carried by a base 16 of insulating material in which one end of the globe is embedded. This is the usual method in connection with previous commercial tubes and for sake of interchangeability I preferably position the pins in the same manner as heretofore, and similarly employ four pins but leave one unconnected since my tube has but three terminals.

In Fig. 1 I have shown my improved tube arranged for operation by the radiant energy of heat rays. The cathode coating 9 is located on the inner member 5, the base 16 is formed with an axial passage 18 opening into the interior of that member, the socket 19 is provided with a secondary socket 20, and the heating element consists of an elongated electric lamp bulb 21.

I do not limit myself to this kind of heating arrangement, since one can use a resistance coil, or a frame or other heating agent, but such an incandescent lamp is the cheapest and most convenient heater available, particularly if purchased in the form widely used for Christmas tree decoration and can equally well be used on A. C. or D. C. circuits and without resistance box or transformer. Most Christmas-tree sets come with eight lamps in series which is ample for most sets and if excessive, the additional lamps are generally welcome for decorative or ornamental use.

Another arrangement is shown in Fig. 5 where the base 15$^a$, instead of being affixed to the annular end of the tube is affixed to the pointed end leaving the internal recess wholly exposed for the direct insertion of a lamp bulb 21 shown in Fig. 6. This kind of tube can be applied to any standard set without change, since the base will fit any make of socket.

In Figs. 7 and 8 I have shown the tubes as arranged for photo-emission, the cathode 9 being located on the outer wall and consisting of some material which emits electrons upon contact with light. The anode 8$^a$ is accordingly made of a network of wires which allow the passage of the light from the filament 25 and also absorb and carry away the evolved electrons. In Fig. 7 the filament is shown as located right in the same chamber with the electrodes.

In Fig. 8 the double walled tube is employed and the light source consists of a lamp 21$^a$ therein. This may, obviously, be a Christmas-tree lamp as before, but I have here shown a neon lamp, which in addition to producing a substantially cold light can be used in another mode, viz: being connected in series with the receiving circuit so that its emitted light will vary with the current in that circuit, thus in turn varying the electron emission and enabling amplification of the light for television or picture transmission purposes.

It is also possible to use my tubes with other heat sources, in which case it is often best to locate the cathode on the outside wall as shown in Figs. 9, 10, 11, 13, 14 and 17 in which case the same may be energized by any source of heat such as a candle or gas flame or a cookstove or kerosene lamp or, in some cases, the sun's rays, all of which are epitomized by the candle in Fig. 14. Owing to the close proximity of the anode and cathode and the large exposed area, and to the fact that a minimum of metal exists inside the tube to emit or absorb gases; and particularly when a substance like sodium or caesium which emits electrons readily is used for the cathode; my improved tubes operate at very low temperatures and exhibit a low impedance. Also, owing to this same close proximity and low impedance it happens in a certain percentage of cases that the initial velocity of the electrons which causes their liberation from the cathode carries them all the way to the anode, especially when the anode lies close to the cathode. Such a tube thus becomes a source of electrical potential and upon connecting the anode and cathode through an external circuit a continuous current flows as long as the proper heat relations are maintained and the pathway is not obstructed.

Thus a series of such tubes when linked together in a radio receiving set as shown in Fig. 17, when subjected to the proper heat conditions, detect and amplify the signals received by the antenna circuit, merely by virtue of the E. M. F. generated in the respective tubes. Obviously such a set could be made more effective by coupling thereto a B battery of some kind; likewise if the modifying elements or grids be omitted as shown in Fig. 10 or merely disused a steady current is produced and a series of such potential tubes can be connected to the set as shown in Fig. 16 and itself constitute a B battery.

In Fig. 16 30 denotes an aerial or antenna inductively coupled at 31 through a variable condenser 32 with a tube A of the type herein described. This tube is here shown as coupled to form a radio frequency amplifier, and its anode 8 is connected through an inductive coupler 33 and variable condenser 34 to a second tube B also serving as a radio amplifier, having its anode 8 connected via inductive coupler 35 and variable condenser 36 to a third tube C here arranged as a detector. The anode 8 of tube C is connected through an inductive coupler 37 with a fourth tube D, here arranged as an audio frequency amplifier. The anode 8 of tube D is connected through the inductive coupler 38 with a further tube E, also acting as an audio frequency amplifier. The anode 8 of tube E is connected to the sound producer 40.

As a B battery I have shown a series F F of the thermo-cells hereinbefore described, connected together in series. The negative lead 41 is connected to the cathode 9 of tubes A, C, D, and E; the positive terminal 42 is connected to the sound producer 40. Intermediate taps 43 and 44 can be connected in the circuit at different points in any desired manner. I have shown for illustrative purposes a composite circuit which is obviously capable of many modifications, although itself very successful.

In Fig. 17 I have shown the same circuit with omission of the battery. Inasmuch as each tube is itself a source of potential a total current can be produced and governed without external aid, sufficient for many purposes but obviously not so strong as when externally supplemented. It will be obvious that one can supplement with any convenient source of E. M. F. and that I am not limited to use a heat-battery for this purpose; also that the heat battery can be used in combination with other types of detecting and amplifying tubes, or that my improved tubes can be used in the same set with other types of tubes.

Of course it will be understood that the electrical and magnetic couplings and the sound producer (or other power output device) must be designed with reference to the use in question. Transformers, telephones, and loudspeakers wound for a B battery of 150 volts are out of place. The voltage produced in each cell is comparatively small and low resistance windings are desirable.

In case the anode and cathode be made of the same material it is necessary that they be kept at different temperatures during operation; if made of metals which exhibit wide differences in electron emission they do not require any temperature difference. The bombardment of the anode tends to raise its temperature and it is possible to provide special means to cool the anode but this is not generally necessary in a device having such a small current consumption and infrequent use as a radio tube; indeed the location of the anode on the outside as shown in Figs. 1, 2, 3, and 5 provides for such heat dissipation. It is possible, however, and within the scope of my invention to make these devices of large size and employ them for the production of large currents for power purposes.

When the emitting coating consists of any of the alkali or alkali-earth metals condensed onto the tube walls these themselves constitute getters for the oxygen contained therein; although it is possible to use other getters in addition or substitution therefor. I have shown these coatings as formed directly on the tube walls, which is obviously the simplest course but it is possible to use other bases for the same, such as a false sheet of glass located inside the container. By connecting a plurality of anodes and cathodes in series a substantial voltage can be built up, as indicated in Fig. 16.

Another mode of use of my improved tube is as a gas tube, the chamber of such a tube as shown in Fig. 8 being filled with a readily ionized gas such as neon, and the lamp 21$^a$ may, if desired, be one which creates primarily neither light nor heat but only ultra-violet rays. Such a tube possesses very low impedance and requires only a very low potential to operate.

It can be used either with or without a grid; when used without a grid the resistance of the gas varies with the ionization produced by the lamp; when used with a grid, the latter serves primarily to control the current flow.

It often occurs that the metals which are most easily plated on the glass are not those which are most easily electronized. Starting with a basis of one of these metals I first coat it with a thin layer of phosphorous, sulphur, selenium or tellurium, or I even oxidize it superficially, and then impregnate the coating with calcium, potassium, sodium, or other low melting point metal of high emissivity. The presence of silicon in this coating apparently in the form of oxide has seemed to be advantageous. These substances are mainly desirable as binding for the emissive substance but are themselves emissive under some conditions.

It will be obvious that a great many changes can be made in the form and design of my improved tube and that many other uses exist, therefore, I do not limit myself in any wise except as specifically recited in my several claims which I desire may be construed each independently of limitations contained in other claims.

Having thus described my invention what I claim is:

1. A thermionic tube comprising a container having a part of its wall transparent to radiant energy, a cathode element inside said container and consisting of a metal plated upon said transparent wall part, an anode consisting of a metal plated upon the inside wall of said container in spaced and operative relation with said cathode, a source of radiant energy for said cathode, said cathode being located between said anode and said source of radiant energy and containing a material which emits electrons under the influence of the radiant energy transmitted through the tube wall, and conductors sealed in the wall of said container and making contact with said cathode and anode respectively.

2. A thermionic tube comprising an anode and a cathode which are formed from conducting material plated on different parts of the inside surface of the wall of an evacuated glass container, a source of radiant energy outside said container, said cathode being interposed between said anode and said source of energy and formed from a material which emits electrons as a consequence of the radiations emitted by said source of radiant energy, and conductors sealed in the wall of said container and making contact with said cathode and anode respectively.

3. An electronic tube comprising an evacuated glass container having an outer wall part and an inner reentrant wall part, a cathode of metal which emits electrons under the influence of heat plated on the surface of one of the wall parts of said container and an anode formed on the surface of the other wall part of said container and located in absorbing relation to said cathode, said anode and cathode being located inside said container with said cathode located in position to be exposed to radiations originating outside said container, said anode being made of a substance which exhibits less electron emission than the cathode under the conditions existing within said container, and conductors sealed in the wall of said container and making contact with said cathode and anode respectively.

4. Electronic tube comprising an evacuated container having inner and outer concentric glass walls the adjacent faces of which are coated with different conductive substances, one of which emits electrons under bombardment by radiant energy and conductors sealed in the container walls making contact with said coatings respectively.

5. Electronic tube comprising an evacuated annular container of non-conducting material which is transparent to radiant energy, said container having electron emitting and absorbing substances coated on opposite integral walls and constituting cathode and anode respectively and means for heating said walls unequally.

6. An electron tube having integral concentric cylindrical glass walls each closed at one end and sealed together at the opposite end, a substance coated on one of said walls which emits electrons when heated, a substance coated on the other wall which absorbs and conducts electrons, and wires sealed in the glass making contact with the respective substances.

7. Electron tube comprising an evacuated glass container having integral outer and inner concentric walls defining an annular chamber, the opposite surfaces of said chamber being coated, the one with a metal which gives off electrons under the influence of radiant energy and the other with a metal which absorbs electrons despite the radiant energy, a grid element located between said coatings, and a source of radiant energy located inside said inner wall.

8. Electronic tube comprising inner and outer tubular glass walls of unequal length and diameter located one inside the other, both closed at one end and integrally joined together at their opposite ends to define an annular chambered vessel, a grid element located in the space between such walls, electron emitting substance coated on that surface of the inner wall which is inside said vessel, an electron absorbing and conducting substance coated on the opposite surface of the outer wall, and conductors sealed in the glass and making contact with the respective substances and said grid.

9. An electron tube comprising a double walled thimble of electrically non-conducting material having its walls integral and having the space between its walls evacuated and the inner surfaces of said walls coated with electrically conducting material, such coatings being electrically insulated one from the other, and one of the same containing material which evolves electrons when heated, in combination with wires sealed in the walls of the tube and engaging said coatings respectively.

10. An electron tube comprising a double walled thimble of electrically non-conducting material having its walls integral and having the space between its walls evacuated and the inner surfaces of said walls coated with electrically conducting material, such coatings being electrically insulated one from the other and the inner coating containing material which evolves electrons when heated, in combination with an incandescent electric lamp bulb located inside the cavity of the thimble.

11. An electron tube comprising a double walled thimble of electrically non-conducting material having its walls integral and having the space between its walls evacuated and the inner surfaces of said walls coated with electrically conducting material everywhere except at the junction of the inner and outer walls of said thimbles one of such coatings containing material which evolves electrons when heated, a grid element located between said coatings and insulated from both of them, a base of insulating material secured to one end of said tube but without obstructing the opening into the inner cavity thereof, and terminals carried by said base connected through the tube wall to said grid and coatings respectively.

12. An electronic tube comprising a double-walled container made entirely of glass and having integral walls, the space between said walls containing a readily inonizable gas, an electrode of conducting material plated on the inner surface of one wall of said tube, a second electrode of conducting material plated on the other wall of said container and facing said first electrode, a source of radiant energy inside the inner wall for causing the transfer of electrons from the adjacent to the more remote electrode, and conductors sealed in the walls of said container and making contact with said electrodes.

13. An electronic tube comprising a double-walled container made entirely of glass and having integral walls, the space between said walls containing a readily ionizable gas, an electrode of conducting material plated on the inner surface of one wall of said tube, a second electrode of conducting material plated on the other wall of said container and facing said first electrode, a control grid between said electrodes, a source of radiant energy inside the inner wall for causing the transfer of electrons from one electrode to the other and conductors sealed in the walls of said container and making contact with said electrodes and grid.

ORAN T. McILVAINE.